(12) United States Patent
Rosati et al.

(10) Patent No.: US 11,379,080 B2
(45) Date of Patent: Jul. 5, 2022

(54) AUTOMATICALLY CORRECTING TOUCHSCREEN ERRORS

(71) Applicant: INTERNATIONAL BUSINESS MACHINES CORPORATION, Armonk, NY (US)

(72) Inventors: Leonardo Rosati, Rome (IT); Roberto Raffo, Rome (IT); Alice Guidotti, Rome (IT); Fabio Cerri, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/894,616

(22) Filed: Jun. 5, 2020

(65) Prior Publication Data

US 2021/0382602 A1    Dec. 9, 2021

(51) Int. Cl.
    *G06F 3/041*    (2006.01)

(52) U.S. Cl.
    CPC .................. *G06F 3/04186* (2019.05)

(58) Field of Classification Search
    CPC ................................... G06F 3/04186
    See application file for complete search history.

(56) References Cited

U.S. PATENT DOCUMENTS

| | | | |
|---|---|---|---|
| 8,502,787 B2 | 8/2013 | Rigazio et al. | |
| 9,176,542 B2 * | 11/2015 | Milne | G06F 1/1694 |
| 9,417,666 B2 * | 8/2016 | Abraham | G06F 1/1694 |
| 10,025,402 B2 | 7/2018 | Shikata et al. | |
| 10,191,630 B2 * | 1/2019 | Regnier | G06F 3/04842 |
| 2004/0100419 A1 * | 5/2004 | Kato | G09G 5/00 345/7 |
| 2010/0127995 A1 * | 5/2010 | Rigazio | G06F 3/04886 345/173 |
| 2010/0225595 A1 * | 9/2010 | Hodges | G06F 3/041 345/173 |
| 2013/0307822 A1 * | 11/2013 | Huang | G06F 3/04186 345/174 |

(Continued)

FOREIGN PATENT DOCUMENTS

| | | |
|---|---|---|
| CN | 104253906 A | 12/2014 |
| CN | 106164824 A | 11/2016 |

(Continued)

OTHER PUBLICATIONS

WO Publication No. 02084580, dated Oct. 24, 2002, is an English language Equivalent of EP Publication No. 1390908, dated Feb. 25, 2004.

(Continued)

*Primary Examiner* — Chun-Nan Lin
(74) *Attorney, Agent, or Firm* — Konrad Raynes Davda & Victor LLP; Janaki K. Davda

(57) ABSTRACT

Provided are techniques for automatically correcting touchscreen errors. A first location input is received from a user touching a global touchscreen of a global device, where the first location input is a location relative to a display surface of the global touchscreen. It is determined that movement of the global device is different from movement of a local device. Motion information of the local device is retrieved. The first location input is corrected to a second location input based on the motion information. In response to the second location input, an operation is performed.

18 Claims, 9 Drawing Sheets

(56) References Cited

U.S. PATENT DOCUMENTS

| | | | |
|---|---|---|---|
| 2014/0025263 A1* | 1/2014 | Geyer | G06F 3/048 701/49 |
| 2014/0028579 A1* | 1/2014 | Taby | G06F 3/017 345/173 |
| 2014/0111550 A1* | 4/2014 | Abraham | G09G 5/00 345/660 |
| 2014/0232634 A1* | 8/2014 | Piemonte | G06F 3/017 345/156 |
| 2016/0188113 A1 | 6/2016 | Alpman et al. | |
| 2016/0231865 A1* | 8/2016 | Harrison | G06F 3/042 |
| 2016/0306491 A1* | 10/2016 | Lee | G06F 3/0416 |
| 2017/0364207 A1* | 12/2017 | Henderson | G06F 3/0482 |
| 2018/0300529 A1* | 10/2018 | Zuo | G06K 9/00087 |
| 2020/0264756 A1* | 8/2020 | Jin | G06F 3/04186 |
| 2021/0056333 A1* | 2/2021 | Cheng | G06F 3/041661 |

FOREIGN PATENT DOCUMENTS

| | | |
|---|---|---|
| EP | 1390908 A1 | 2/2004 |
| WO | 02084580 A1 | 10/2002 |

OTHER PUBLICATIONS

Bi, X., et al., Octopus: Evaluating Touchscreen Keyboard Correction and Recognition Algorithms via "Remulation", Proceedings of the SIGCHI Conference on Human Factors in Computing Systems (CHI 2013), 2013, 10 pp. (available online http://citeseerx.ist.psu.edu/viewdoc/download?doi=10.1.1.297.7296&rep=rep1&type=pdf).

Bruwer, F.J., et al., "Vehicle Acceleration Estimation Using Smartphone-Based Sensors", Conference Paper, Jul. 2015, 11 pp. (available online at • https://www.researchgate.net/publication/279537785_VEHICLE_ACCELERATION_ESTIMATION_USING_SMARTPHONE-BASED_SENSORS).

Goel, M., et al., "WalkType: Using Accelerometer Data to Accommodate Situational Impairments in Mobile Touch Screen Text Entry", In Proceedings of the Conference on Human Factors in Computing Systems (CHI 2012), 2012, 10 pp. (available online https://faculty.washington.edu/leahkf/pubs/CHI2012-Goel-WalkType.pdf).

Sin, B., "The Entire Screen of Vivo's new Phone Is A Fingerprint Scanner, And It Works Well", [online], Mar. 11, 2019, [Retrieved on May 18, 2020], Retrieved from the Internet at <URL: https://www.forbes.com/sites/bensin/2019/03/11/the-entire-screen-of-vivos-new-phone-is-a-fingerprint-scanner-and-it-works-well/>, 5 pp.

Thomas, C., "Hand Posture's Effect on Touch Screen Text Input Behaviors: A Touch Area Based Study", Apr. 2015, 3 pp. (available online at https://arxiv.org/pdf/1504.02134.pdf).

International Search Report and Written Opinion for International Application No. PCT/IB2021/054237, dated Jul. 27, 2021, 8 pp. [57.493PCT (ISR & WO)].

\* cited by examiner

AUTOMATICALLY CORRECTING TOUCHSCREEN ERRORS

BACKGROUND

Embodiments of the invention relate to automatically correcting touchscreen errors. In particular, embodiments of the invention relate to automatically correcting touchscreen errors of a device through external or non-worn sources of information.

There are strategies and systems to detect and correct wrong typing when using a touchscreen of a device. Some strategies are based on human behavior and general interaction with the touchscreen, especially its keyboard, while other strategies are based on motion sensors (e.g., accelerometers).

These strategies are useful in detecting situational impairments by leveraging the motion sensor inside the device that is exposing the touchscreen. These strategies are based on the assumption that the relative movement of the finger and the touchscreen is the same, so that errors caused by walking vibrations and/or loss of attention may be corrected by the inner motion sensor of the device.

For example, a person is holding a smartphone with a touchscreen and walking. The motion sensor inside the smartphone measures the acceleration of the person based on the assumption that the smartphone and the person are one unique rigid body. Therefore, the inertia causing a relative delta movement of the finger on the touchscreen is proportional to the acceleration measured by the motion sensor of the smartphone.

SUMMARY

In accordance with certain embodiments, a computer-implemented method is provided for automatically correcting touchscreen errors. The computer-implemented method comprises operations. A first location input is received from a user touching a global touchscreen of a global device, where the first location input is a location relative to a display surface of the global touchscreen. It is determined that movement of the global device is different from movement of a local device. Motion information of the local device is retrieved. The first location input is corrected to a second location input based on the motion information. In response to the second location input, an operation is performed.

In accordance with other embodiments, a computer program product is provided for automatically correcting touchscreen errors. The computer program product comprises a computer readable storage medium having program code embodied therewith, the program code executable by at least one processor to perform operations. A first location input is received from a user touching a global touchscreen of a global device, where the first location input is a location relative to a display surface of the global touchscreen. It is determined that movement of the global device is different from movement of a local device. Motion information of the local device is retrieved. The first location input is corrected to a second location input based on the motion information. In response to the second location input, an operation is performed.

In accordance with yet other embodiments, a computer system is provided for automatically correcting touchscreen errors. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A first location input is received from a user touching a global touchscreen of a global device, where the first location input is a location relative to a display surface of the global touchscreen. It is determined that movement of the global device is different from movement of a local device. Motion information of the local device is retrieved. The first location input is corrected to a second location input based on the motion information. In response to the second location input, an operation is performed.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments automatically correct errors in typing on a touchscreen of a device that does not have a motion sensor (e.g., an accelerometer) or where the inner motion sensor of the device cannot be put in a direct relationship with the movement of the user. For example, embodiments automatically correct touchscreen errors in the following scenarios:

the touchscreen and the user using the touchscreen are not one rigid body, therefore, the relative movement of the finger of the user and the touchscreen are not the same;
the device does not have an installed motion sensor; and
more than one user may use the same touchscreen simultaneously.

Figure 1:
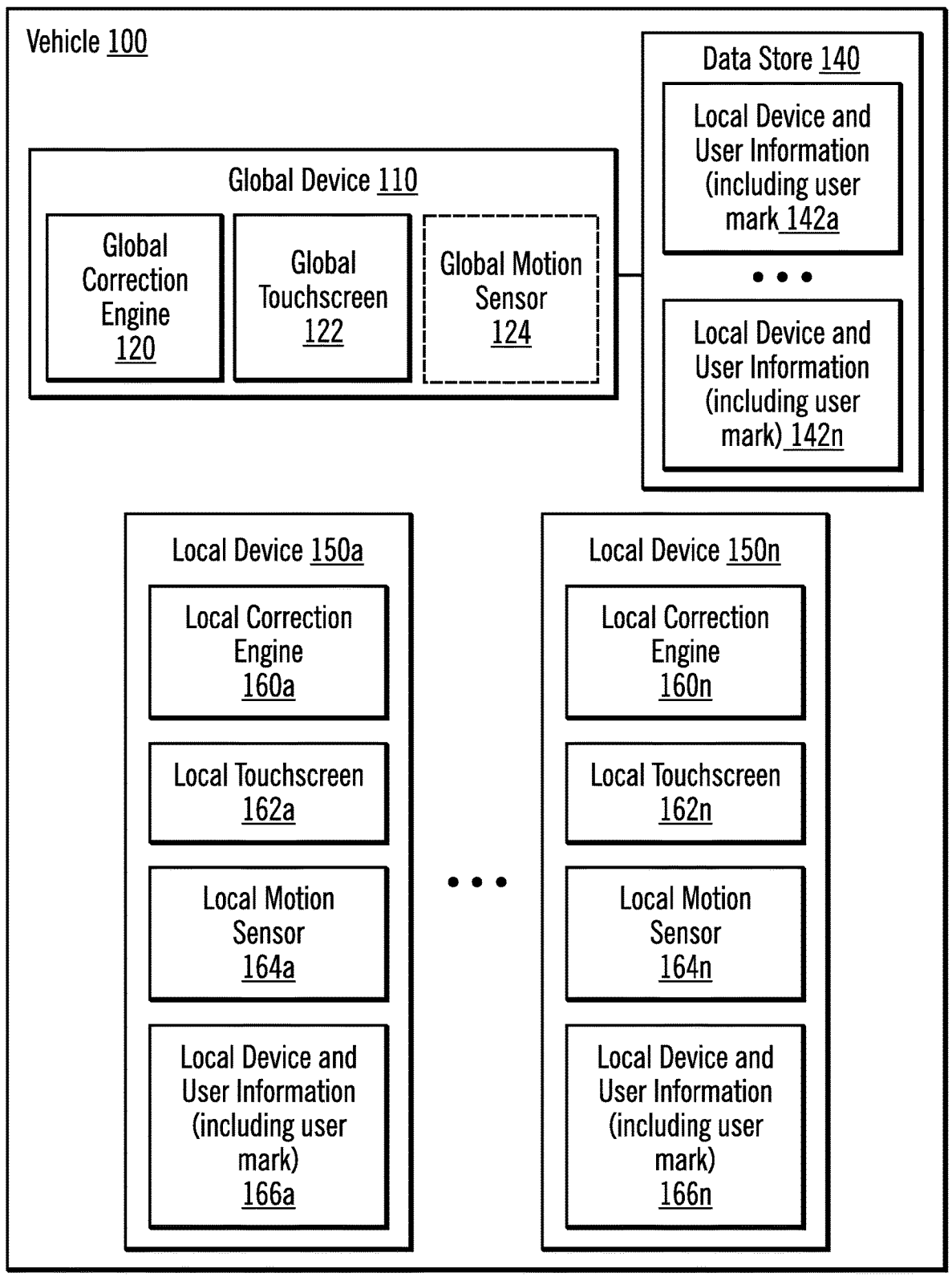
FIG. 1 illustrates, in a block diagram, a computing environment in accordance with certain embodiments.

FIG. 1 illustrates, in a block diagram, a computing environment in accordance with certain embodiments. A vehicle 100 includes a global device 110 and one or more local devices 150a . . . 150n. The vehicle 100 may be a car, an electric bicycle, an airplane, a truck, a motorcycle, etc. For example, the global device 110 may be a device that is part of a car's console or may be a device on a seatback of an airplane. The global device 110 may be described as an external or non-worn device (e.g., the global device 110 is not worn by a user (i.e., a person)).

The global device 110 may be a device integrated with the vehicle, and the global touchscreen 122 may be used to select various services (e.g., navigation, music, phone calls, etc.). The global device 110 is coupled to or includes a data store 140. The global device 110 includes a global correction engine 120, a global touchscreen 122, and may optionally include a global motion sensor 124. Thus, in some embodiments, the global device 110 includes a global motion sensor 124, and, in other embodiments, the global device 110 does not include a global motion sensor 124. The global touchscreen 122 may be an interactive keyboard or other user interface.

Each local device 150a . . . 150n may be a smartphone, a wearable device (e.g., a smart watch), a tablet computer, a laptop computer, or any other device with a touchscreen. Each local device 150a . . . 150n includes a local correction engine 160a . . . 160n, a local touchscreen 162a . . . 162n, a local motion sensor 164a . . . 164n, and local device and user information 166a . . . 166n. The local device and user information 166a . . . 166n includes one or more attributes about the local device 150a . . . 150n and one or more attributes about each user who uses the local device 150a . . . 150n and provided a user mark. The local device information includes a local device identifier that identifies the local device 150a . . . 150n and may include other attributes about the local device 150a . . . 150n (e.g., type of device (smartphone or smart watch), brand of device, etc.). The user information for a user includes a user identifier (e.g., a user name), a user mark (e.g., a fingerprint, a word, a symbol, etc.) and may include other attributes about the user.

The data store 140 includes local device and user information 142a . . . 142n that corresponds to the local device and user information 166a . . . 166n. When the global correction engine 120 receives the user mark, the global correction engine 120 uses the local device and user information 142a . . . 142n to locate the user mark, identify the user who provided the user mark, and identify the local device 150a . . . 150n of that user. In certain embodiments, the data store 140 includes local device and user information 142a . . . 142n for a subset of the local devices 150a . . . 150n (e.g., because one or more local devices 150a . . . 150n have settings so that they do not communicate with the global device 110).

In certain embodiments, each motion sensor 124, 164a . . . 164n is an accelerometer. In certain embodiments, any motion sensor 124, 164a . . . 164n that provides motion (e.g., acceleration) of the device or that may be used to calculate motion (e.g., acceleration) of the device may be used.

The global correction engine 120 communicates with a local correction engine 150a . . . 150n to adjust a location input (e.g., a position) on the global touchscreen 122. For example, if a user in a car intends to place a finger on position X50,Y20 on the global touchscreen 122 to select a "call" button, but, due to movement of the car, the finger is inadvertently placed on position X40,Y15, then the global correction engine 120 identifies the correct position of X50, Y20 as location input to the global touchscreen 122 and, in some embodiments, notifies the local correction engine 160a . . . 160n to accept input of X50,Y20 when the local correction engine 160a . . . 160n is to perform some processing based on the location input. In particular, the global correction engine 120 leverages the local motion sensor 164a . . . 164n of the local device 150a . . . 150n to make the correction.

With embodiments, the global correction engine 120 corrects errors made by a driver of a car (i.e., a type of vehicle 100) while typing on the global touchscreen 122, where the errors occur because of sudden shocks transmitted to the driver as the car's motion is impacted by bumps, road conditions, braking, vibrations, etc. With embodiments, the global correction engine 120 corrects errors made by a passenger of an airplane (i.e., a type of vehicle 100) using a global touchscreen 122 during turbulence. In these examples, conventional solutions that rely on accelerometers (a type of motion sensors) do not work because the touchscreen installed in cars or airplanes typically do not have accelerometers.

Even if accelerometers are installed in the cars or airplanes with the global touchscreens 122, the passenger/driver and the global touchscreen 122 are not a unique rigid body. Instead, dampers or shock absorbers installed in the seat (of the car or airplane) or in the vehicle create a more complex physical condition where the global touchscreen 122 is not held by the user who may be moving, which means that the user and the global touchscreen 122 are not a unique rigid body.

Although examples herein may refer to a car, embodiments also apply to other vehicles (e.g., an airplane).

Figure 2:
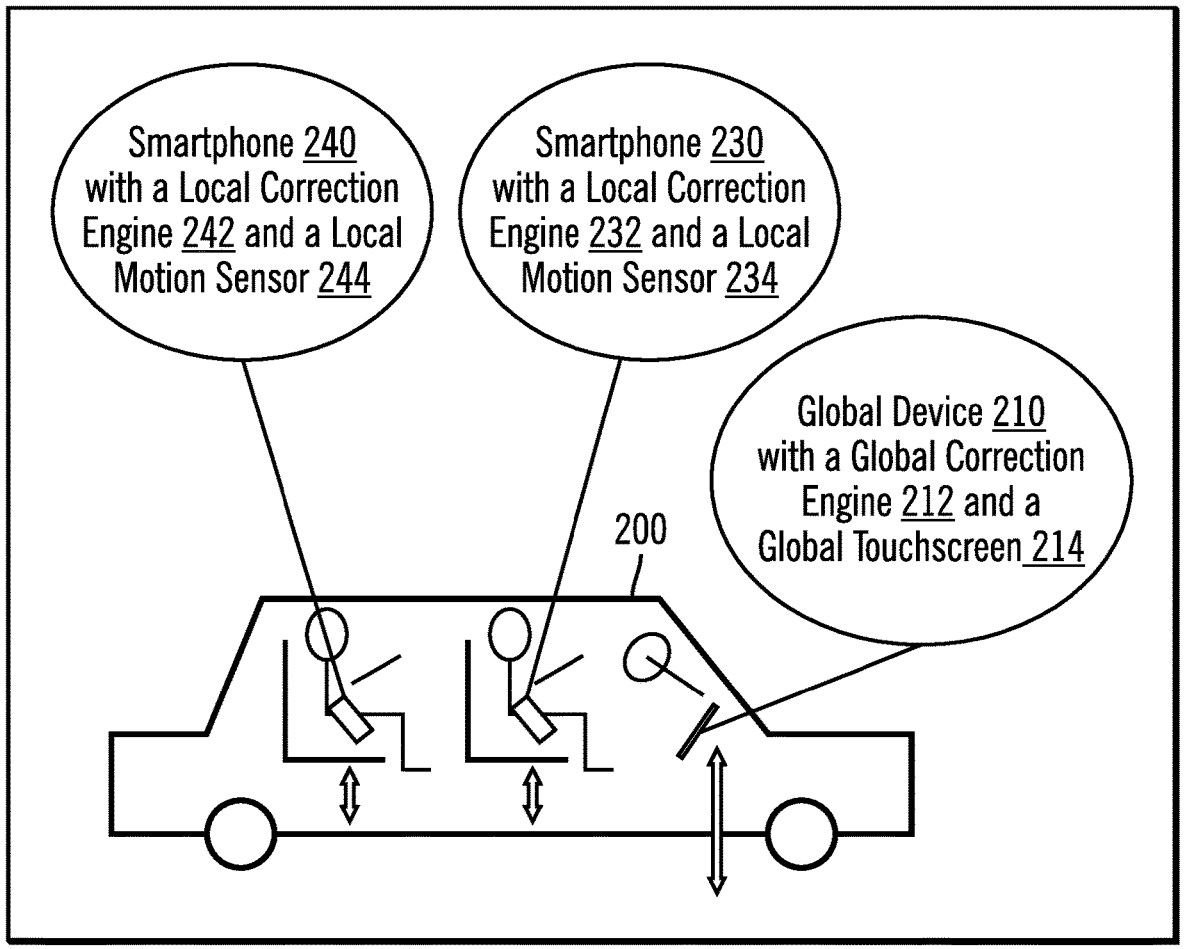
FIG. 2 illustrates devices in a car in accordance with certain embodiments.

FIG. 2 illustrates devices in a car in accordance with certain embodiments. In FIG. 2, a car 200 includes a global device 210 (i.e., a vehicle device) with a global correction engine 212 and a global touchscreen 214. The car also includes two smartphones 230, 240 (i.e., local devices). The driver (one user) has one smartphone 230 with a local correction engine 232 and a local motion sensor 234, and a passenger (another user) has another smartphone 240 with a local correction engine 242 and a local motion sensor 234.

If the car 200 has a shock (e.g., due to a bump in the road, road conditions, braking, vibrations, etc.), the relative movement of the global touchscreen 214 installed on the car's console is different from the movement of each user (because of many factors, such as seats absorbing part of the shock, distance from the global touchscreen 214, the user's attributes, etc.). This leads to errors in the user touching the global touchscreen 214 that are proportional to the difference of the motion (e.g., acceleration) of the global touchscreen 214 and the motion (e.g., acceleration) of the user. In this example, the user and the global touchscreen 214 are not a unique rigid body, and this makes ineffective the (potential) usage of any motion sensor (e.g., accelerometer) present in the car 200.

Assuming the user and smartphone 230 or 240 form one rigid body, the error is proportional to the difference in motion (e.g., acceleration) of the two objects: the global touchscreen 214 (object 1) versus the smartphone 230, 240 (object 2). With embodiments, the global correction engine 212 of the vehicle device is able to communicate with the local correction engine 232, 242 of the smartphone 230, 240 to obtain the motion of the smartphone 230, 240 from the local motion sensor 234, 244. Then, the global correction engine 212 adjusts the location input of the user's finger on the global touchscreen 214 based on the real motion of the smartphone 230, 240 of the user (where the user's finger is designated as moving the same as the smartphone 230, 240).

Figure 3:
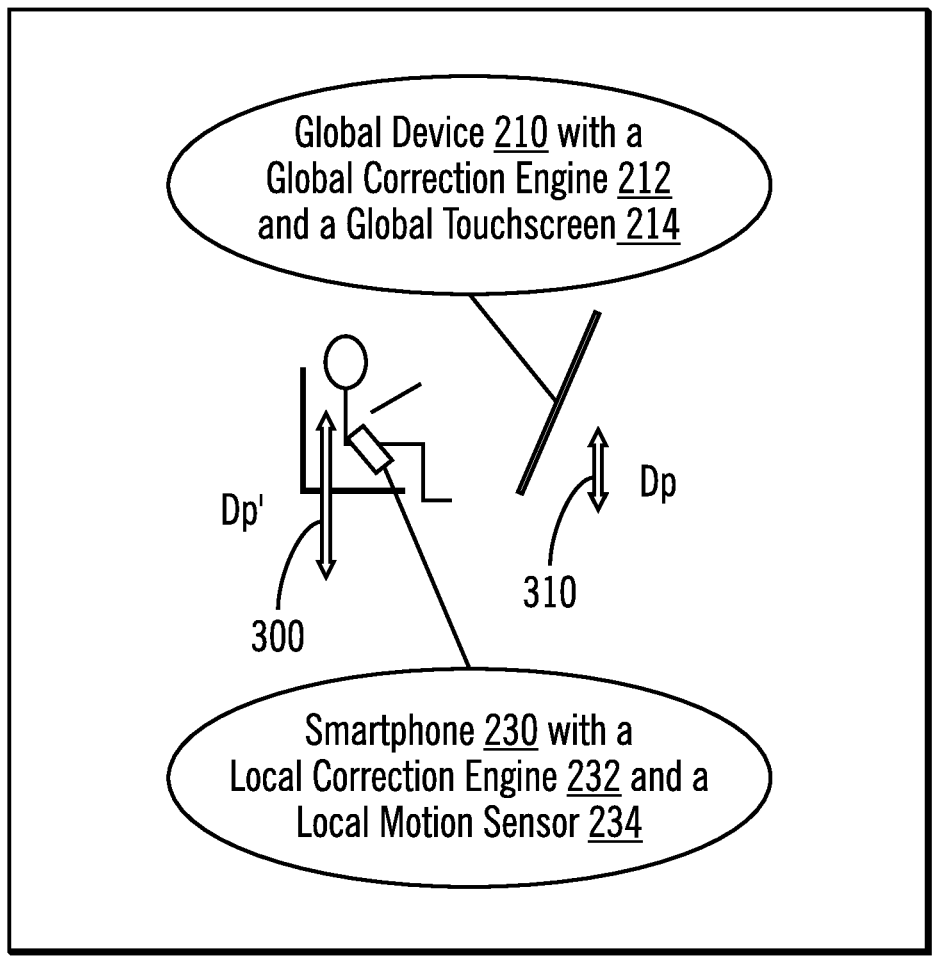
FIG. 3 illustrates motion of devices in the car in accordance with certain embodiments.

FIG. 3 illustrates motion (e.g., acceleration) of devices in the car in accordance with certain embodiments. In FIG. 3, a user has a smartphone 230 and is using the global touchscreen 214. When there is a bump in the road as the car 200 is moving, the user's seat causes the user to have a longer vertical movement 310 to better absorb the bump. However, the global touchscreen 214 follows the car's movement and has a shorter vertical movement 320. The user's finger movement is measured by the motion sensor on the user's smartphone 230 as Dp' 300. The global touchscreen 214 uses the measurement from the motion sensor of the smartphone 230 (Dp') as input and corrects the location input of the user's finger on the global touchscreen 214.

Figure 4:
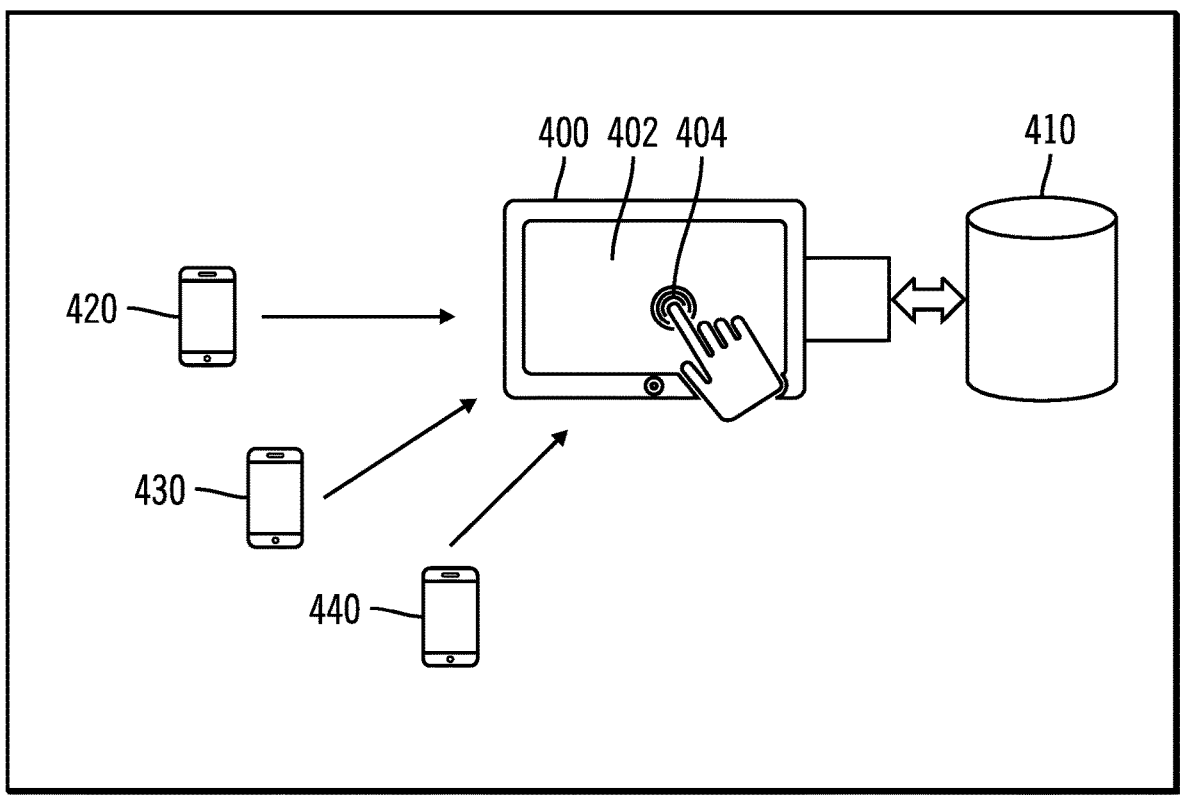
FIG. 4 illustrates a global device and local devices in accordance with certain embodiments.

FIG. 4 illustrates a global device and local devices in accordance with certain embodiments. A global device 400 is coupled to a database 410 (i.e., a type of data store) for storing local device information and user information. In certain embodiments, the global correction engine of the global device 100 is a plugin. The global device 400 also recognizes and is able to communicate with local devices 420, 430, 440. The global device 400 has a global touchscreen 400 with a display surface 404. The global correction engine of the global device 400 receives sensor input data from a touch sensor of the global touchscreen 402 that indicates location information relative to a display surface 404 of the touchscreen 402.

Initially, the global correction engine of the global device 100 discovers and registers the local devices 420, 430, 440. The global correction engine of the global device 100 also associates the local devices with users based on user marks (e.g., fingerprints, words, symbols, etc.) provided on the local touchscreens of the local devices 420, 430, 440. Then, the global correction engine of the global device 100 applies a correction factor to movement of a finger on the global touchscreen based on movement determined by a motion sensor of the local device 420, 430, 440.

Figure 5:
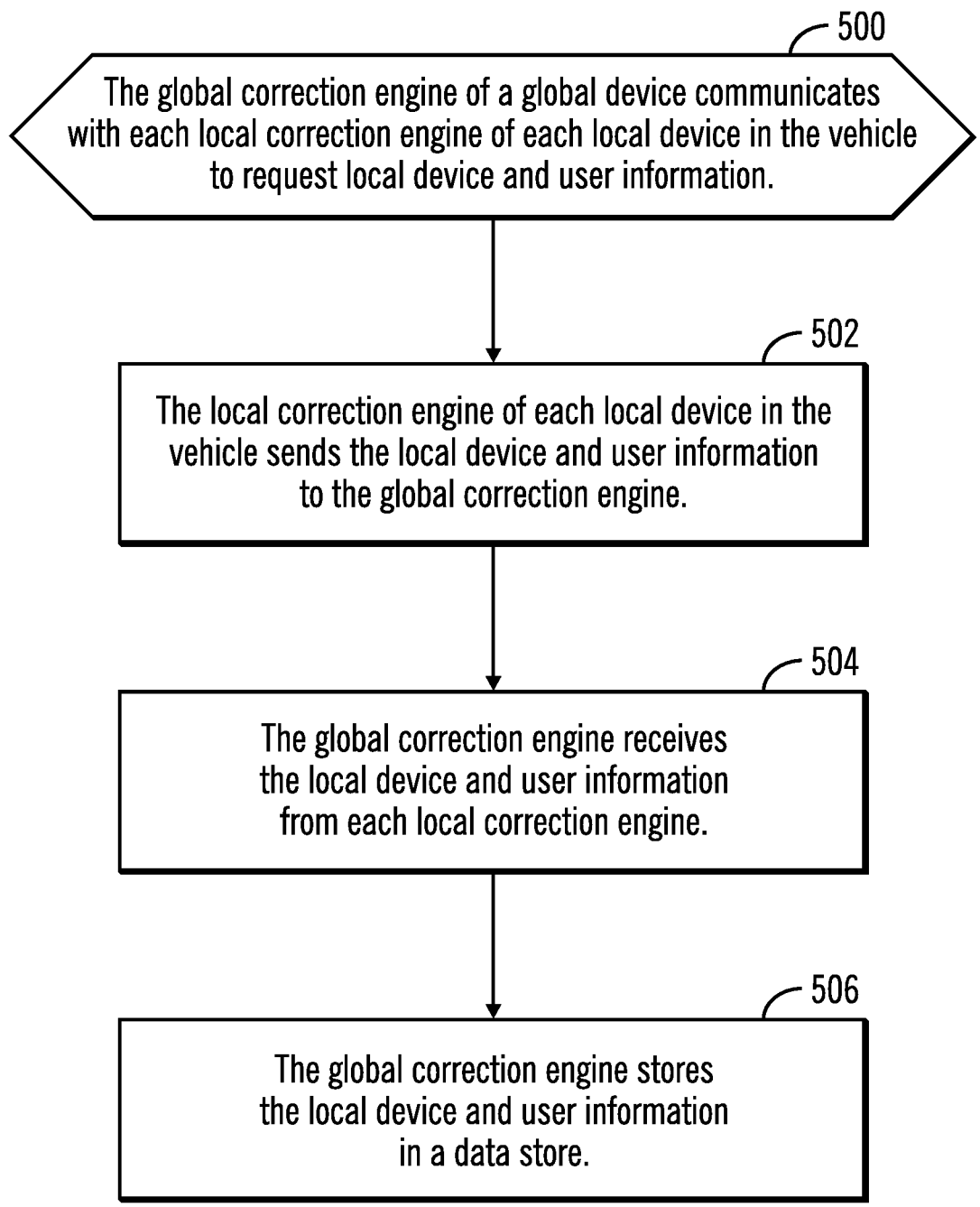
FIG. 5 illustrates, in a flowchart, operations for device registration in accordance with certain embodiments.

FIG. 5 illustrates, in a flowchart, operations for device registration in accordance with certain embodiments. Control begins at block 500 with the global correction engine 120 of the global device 110 communicating with each local correction engine 160a . . . 160n of each local device 150a . . . 150n in the vehicle 100 to request local device information 142. In certain embodiments, the device information is a device identifier. In other embodiments, other device information may be provided, such as a protocol for communicating.

In block 502, the local correction engine 160a . . . 160n of each local device 150a . . . 150n in the vehicle sends the local device and user information 142a . . . 142n to the global correction engine 120. In block 504, the global correction engine 120 receives the local device and user information 142a . . . 142n from each local correction engine 160a . . . 160n. In block 506, the global correction engine 120 stores the local device and user information 142a . . . 142n in the data store 140.

Thus, the processing of FIG. 5 allows for coupling the global device 110 and each local device 150a . . . 150n. With various embodiments, identification of devices for coupling them and exchanging information may occur in different ways.

Figure 6A:
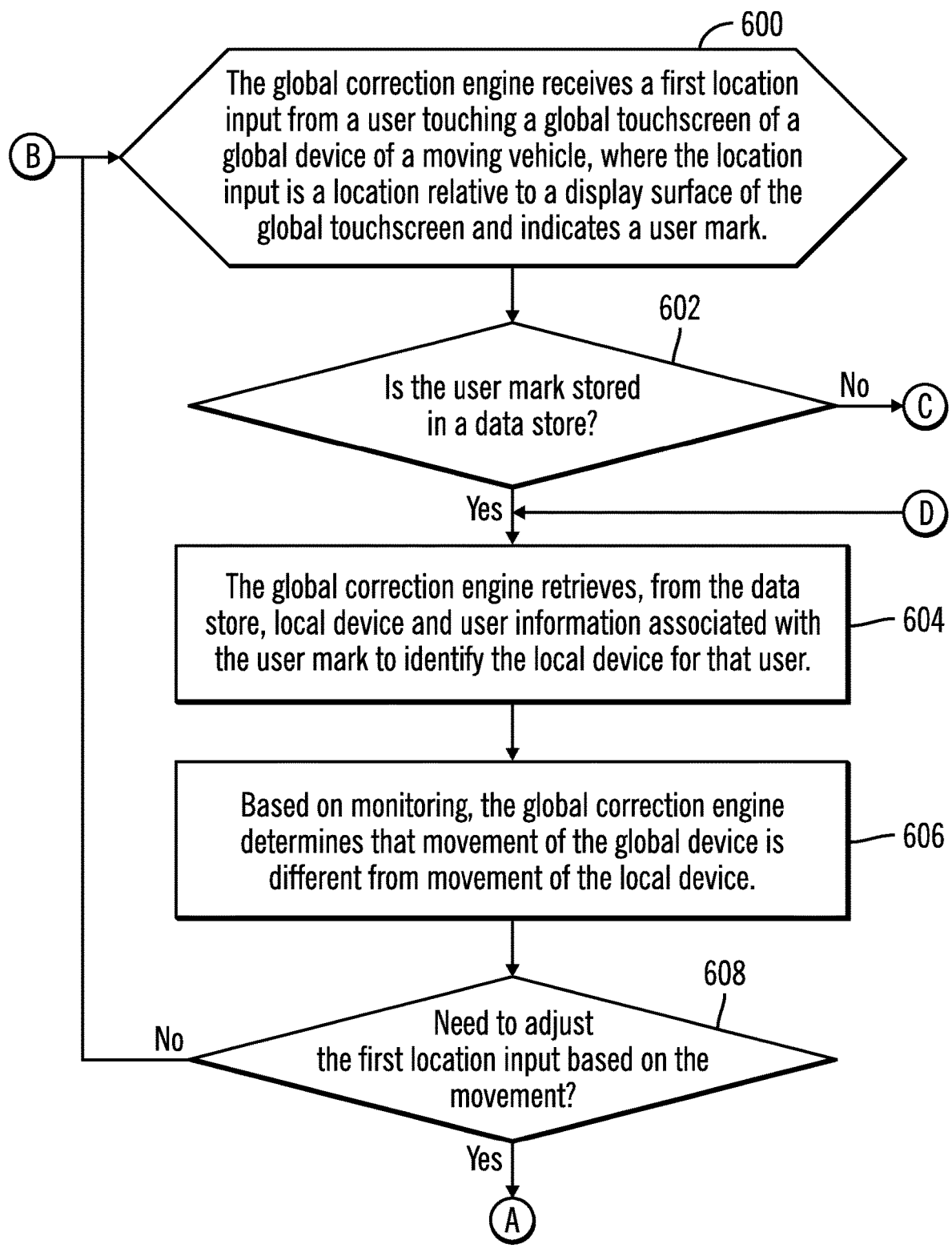
FIGS. 6A, 6B, and 6C illustrate registration, monitoring, and correction in accordance with certain embodiments.
Figure 6B:
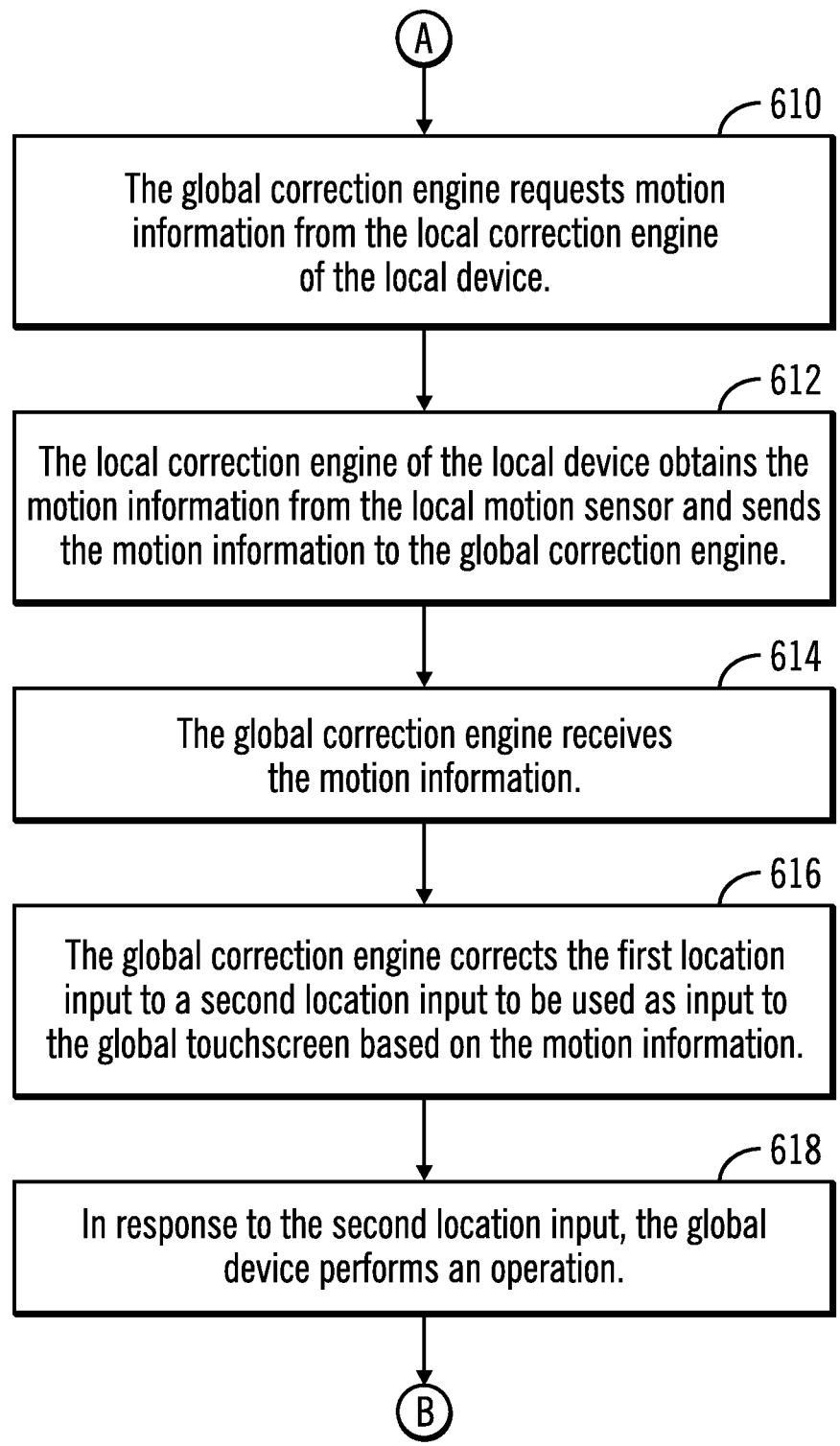
Figure 6C:
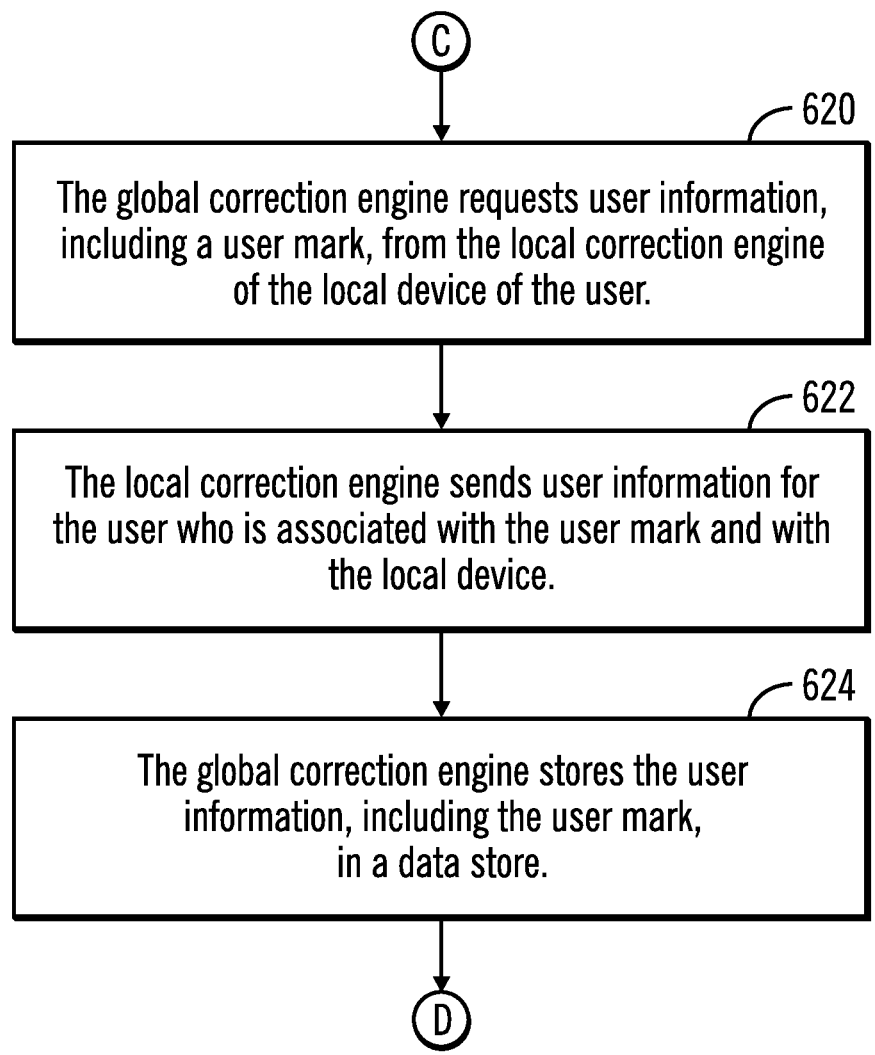

FIGS. 6A, 6B, and 6C illustrate registration, monitoring, and correction in accordance with certain embodiments. Control begins at block 600 with the global correction engine 120 receiving a first location input from a user touching a global touchscreen 122 of a global device 110 of a moving vehicle 100, where the location input is a location relative to a display surface of the global touchscreen 122 and indicates a user mark. That is, in certain embodiments, a user uses a finger to provide a user mark, such as a fingerprint, at the location of the first location input. The processing of block 600 may be described as receiving sensor input data from a touch sensor of the global touchscreen 122, where the sensor input data provides the location input relative to a display surface of the touchscreen.

In block 602, the global correction engine 120 determines whether the user mark for the user is stored in a data store 140. If so, processing continues to block 604, otherwise, processing continues to block 620 (FIG. 6C).

In block 604, the global correction engine 120 retrieves, from the data store 140, local device and user information 142a . . . 142n associated with the user mark to identify the local device 150a . . . 150n for that user. In certain embodiments, the user mark is a fingerprint, and the global correction engine 120 receives the fingerprint of the user and uses the fingerprint of the user to identify the local device 150a . . . 150n. In certain embodiments, multiple users may access the same global touchscreen 122, so the local device and user information 142a . . . 142n retrieved is particular to the user whose user mark has been received.

In block 606, based on monitoring, the global correction engine 120 determines that movement of the global device 110 is different from movement of the local device 150a . . . 150n. In block 608, global correction engine 120 determines whether there is a need to adjust the first location input based on the movement. If so, processing continues to block 610 (FIG. 6B), otherwise, processing continues to block 600 (FIG. 6A).

When determining whether to correct the error, the global correction engine 120 takes into account whether the local device 150a . . . 150n providing the motion information is one rigid body with the user. Sometimes the local device 150a . . . 150n is not a rigid body with the user. For example, this may happen if the local device 150a . . . 150n is on a bag or on a vehicle's shelf (in which case the local device 150a . . . 150n is one rigid body with the vehicle and, thus, with the global touchscreen 122). As another example, this may happen if the user is moving the local device 150a . . . 150n (e.g., with one hand, while using the local device 150a . . . 150n with the other hand). Therefore, the global correction engine 120 determines whether or not to apply a correction factor. In the case in which the local device 150a . . . 150n is one rigid body with the global touchscreen 122, the correction factor may be zero or near zero, which results in no or a small correction being applied. In the case in which the local device 150a . . . 150n is moving, the correction factor may be either high or fluctuating in a short timeframe, which may be two conditions checked by the global correction engine 120 to decide whether or not to perform the correction.

In block 610, the global correction engine 120 requests motion information (e.g., acceleration information) from the local correction engine 160a . . . 160n of the local device 150a . . . 150n. This indicates movement of the user associated with the local device 150a . . . 150n. In block 612, the local correction engine 160a . . . 160n of the local device 150a . . . 150n obtains the motion information from the local motion sensor 164a . . . 164n sends the motion information to the global correction engine 120. In block 614, the global correction engine 120 receives the motion information. This may be described as receiving motion information from a motion sensor 164a . . . 164n of the local device 162a . . . 162n.

In block 616, the global correction engine 120 corrects the first location input to a second location input to be used as input to the global touchscreen based on the motion information. For example, if the user put a finger on the global touchscreen 122 as the car went over a bump, then the user has a different motion than the global touchscreen 122, and the user's finger lands in a different location on the display surface of the global touchscreen 122 than desired by the user (e.g., on an "end call" button on the global touchscreen 122). To correct this, the global correction engine 120 takes the motion information of the user into account to determine a second location input on the display surface of the global touchscreen 122 that is deemed to be the desired location on the global touchscreen 122 (e.g., on a "mute" button on the global touchscreen 122). In block 618, in response to the second location input, the global device 110 performs an operation (e.g., the second location input selects a "mute" button, and the global device 110 performs a mute function). Thus, with the correction of the first location input to the second location input, in this example, the global device 110 process selection of a "mute" button instead of selection of an "end call" button. From block 618 (FIG. 6B), processing continues to block 600 (FIG. 6A).

In block 620 (FIG. 6C), the global correction engine 120 requests user information, including a user mark, from the local correction engine 160a . . . 160n of the local device 150a . . . 150n of the user. In block 622, the local correction engine 160a . . . 160n sends user information for the user who is associated with the user mark and with the local device. In various embodiments, the user information that is returned may be part of (i.e., the user information part) or all of the local device and user information 166a . . . 166n. In block 624, the global correction engine 120 stores the user information, including the user mark, in a data store. From block 624 (FIG. 6C), processing continues to block 604 (FIG. 6A). Thus, registration of the user occurs by the user providing a user mark used to control the local device 150a . . . 150n. In such embodiments, both the global correction engine 120 and the local correction engine 160a . . . 160n are able to detect user marks, and each of the local correction engines 160a . . . 160n is able to send a user mark to the global correction engine 120.

Coupling of the local device 150a . . . 150n with the global device 110 may be done in various ways. For example, in the case of a car's driver, no new logic is needed because modern cars already allow local devices 150a . . . 150n (e.g., smartphones) to register for several functions. This may also be true for airplanes in some cases, which allows use of the local device 150a . . . 150n for listening to airplane provided music. In addition, passengers or airplane touchscreen users may register when entering the vehicle or on the global touchscreen itself, by coupling the local device 150a . . . 150n through a Bluetooth code or other technologies.

In certain embodiments, the network delays of the communication from/to the local device 150a . . . 150n and the global device 110 may not be as fast as the instant applications of the two motions (of the vehicle and the user). With certain embodiments, it may be that the correction applied by the global correction engine 120 happens a short period of time after the error has been typed. However, with such embodiments, such near real-time correction suffices, as the error is corrected before the user notice the error or before the error has an effect on the next decision of the user.

In certain embodiments, the global correction engine 120 discovers how many local devices 150a . . . 150n (e.g., smartphones) are able to interact with the global touchscreen 122 and who is the user (e.g., owner) of each of the local devices 150a . . . 150n. Then, when the global touchscreen 122 receives input of a finger touch, the global correction engine 120 is able to associate the finger with the user and the local device 150a . . . 150n to apply the correction for that user (based on the local motion sensor information of the user's local device 150a . . . 150n).

In some embodiments, users actively register the local device 150a . . . 150n (e.g., smartphone) for a number of reasons (e.g., to download music, to make phone calls from a centralized system, etc.). In addition, the global correction engine 120 is able to detect whether the user and local device 150a . . . 150n have registered when the user touches the global touchscreen 122 with a user mark. If the user mark is not recognized (i.e., not found in the data store 140), the global correction engine 120 requests registration of that user.

In some embodiments, not all the touchscreens recognize the user mark and not all user marks are registered. In such embodiments, the user is asked to touch on a limited area of a touchscreen (global or local touchscreen) for registering a user mark. In certain embodiments, with multiple users using the same global touchscreen 122, the global correction engine 120 determines the correction based on the local device 150a . . . 150n associated with the last user who registered a user mark.

Also, in some embodiments, devices exist where all of the touchscreen is enabled for finger recognition. If the fingerprint touching the global touchscreen 122 is not recognized, the global correction engine 120 may still correct the location input using the last connected user (e.g., treating this as a good approximation) if such registration happened in a reasonable time window in the past.

In certain embodiments, the global correction system 120 performs correction in response to the user touching the global touchscreen 122 with a finger. Then, the global correction engine 120 searches for the fingerprint in the data store, and, if the fingerprint is not found, starts the registration of the user to obtain the fingerprint.

In other embodiments, the user provides a user mark (e.g., with a pen or other device used for input on the global touchscreen 122). Then, the global correction engine 120 searches for the user mark in the data store, and, if the fingerprint is not found, starts the registration of the user to obtain the user mark.

Then, at each time that the user touches the global touchscreen 122 with a finger, the global correction engine 120 obtains the relative motion of the local device 150a . . . 150n and applies a corrector factor to correct a location input of the finger on the global touchscreen 122.

In certain embodiments, the global correction engine 120 uses the following formula to determine an amount of change to the location input:

$$\text{change in location input } \Delta p = \tfrac{1}{2} \alpha \text{local device } \Delta t^2$$

That is, the change in the location input (i.e., position) is equal to half of the acceleration ($\alpha$) for the local device 150a . . . 150n times a unit of time for the user to act on the global touchscreen ($\Delta t^2$). In certain embodiments, the unit of time is an estimated unit of time.

With embodiments, the local motion sensor 164a . . . 164n is able to provide both intensity and direction (latitude x, longitude y, and height z) of movement. In various embodiments, the global correction engine 120 takes into account one or more of latitude x, longitude y, and height z (e.g., certain embodiments may take latitude x into account). With embodiments, the global correction engine 120 estimates the change in location input as the time difference between the event of the acceleration registered by the local motion sensor 164a . . . 164n and the time the user pressed the global touchscreen 122, for very small amounts of time.

In the case of latency in the communication between the local device 150a . . . 150n and the global touchscreen 122, the correction may be applied with some delay, which works in various use cases, such as: switching a radio station, composing a phone number, looking up a contact in an address book, etc. In this case, the global correction engine 120 uses the following formula to determine an amount of change to the location input:

change in location input $\Delta p = \frac{1}{2}(\alpha_{local\ device} - \alpha_{global\ touchscreen})\Delta t^2$ That is, the change in the location input (i.e., position) is equal to half of the acceleration ($\alpha$) for the local device 150a . . . 150n minus the acceleration ($\alpha$) for the global touchscreen 122 times a unit of time for the user to act on the touchscreen ($\Delta t^2$).

In certain embodiments, the unit of time is an estimated unit of time.

Embodiments calculate and mitigate the error in interacting with a global touchscreen 122 by using acceleration information coming from a local device 150a . . . 150n with a local motion sensor 164a . . . 164n associated to the user. In the case of multiple potential users of one single global touchscreen 122, embodiments identify which user is interacting with the global touchscreen 122 and select the correct source (local device 150a . . . 150n) of motion information in order to apply the correct fix to the location input to global touchscreen 122.

In certain embodiments, the motion is acceleration, and embodiments calculate relative acceleration and understand from which local device 150a . . . 150n of a plurality of local devices 150a . . . 150n that the other acceleration information is coming from. Embodiments link the user's own acceleration, via the local device 150a . . . 150n, with the acceleration of the vehicle 100.

Embodiments process location input of a user received from a touch sensor of a global touchscreen 122 of a global device 110. Embodiments receive sensor input data from the touch sensor, where the sensor input data includes location input providing location information relative to a display surface of the global touchscreen 122, receive motion information from a location motion sensor 164a . . . 164n of a local device 150a . . . 150n, and correct the location input based on the motion information. With embodiments, the motion information is received from the local motion sensor 164a . . . 164n located remotely at the local device 150a . . . 150n with respect to the global device 110.

With embodiments, the global device 110 and the local device 150a . . . 150n are movable with respect to each other. The motion information is received from the local device 150a . . . 150n, which is a mobile computing device carried by a user. The local device 150a . . . 150n is registered with the global device 110. The global device 110 receives local device and user information 142a . . . 142n that identifies a registered user and selects a local motion sensor 164a . . . 164n of a local device 150a . . . 150n associated with the identified user. The global device 110 receives motion information from the selected local motion sensor 164a . . . 164n and corrects the location input of the sensor input data.

With embodiments, the local device and user information 142a . . . 142n includes a fingerprint of the registered user using the global touchscreen 122. The local motion sensor 164a . . . 164n is operable for generating motion information describing a motion, such as acceleration. The global device 110 may be a vehicle user interface device.

Figure 7:
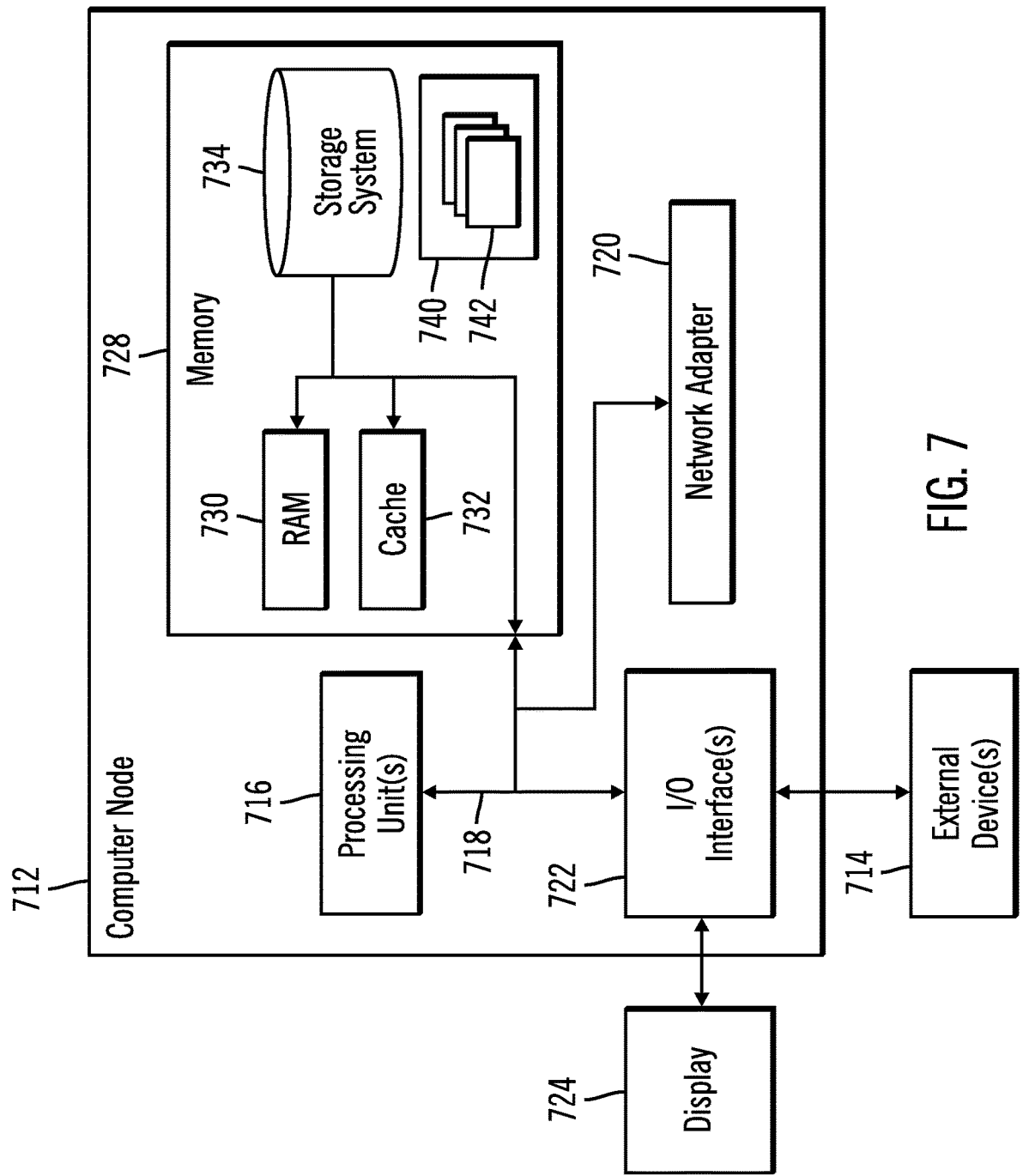
FIG. 7 illustrates a computing environment in accordance with certain embodiments.

FIG. 7 illustrates a computing environment in accordance with certain embodiments. Referring to FIG. 7, computer system 712 is only one example of a suitable computing system and is not intended to suggest any limitation as to the scope of use or functionality of embodiments of the invention described herein. Regardless, computer system 712 is capable of being implemented and/or performing any of the functionality set forth hereinabove.

The computer system 712 may be a computer system, which is operational with numerous other general purpose or special purpose computing system environments or configurations. Examples of well-known computing systems, environments, and/or configurations that may be suitable for use with computer system 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 712 typically includes a variety of computer system readable media. Such media may be any available media that is accessible by computer system 712, and it includes both volatile and non-volatile media, removable and non-removable media.

System memory 728 can include computer system readable media in the form of volatile memory, such as random access memory (RAM) 730 and/or cache memory 732. Computer system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via Input/Output (I/O) interfaces 722. Still yet, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

In certain embodiments, the global computing device 100 and each local computing device 150 . . . 150n has the architecture of computer system 712.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    discovering a plurality of local devices;
    receiving a user mark from each local device of the plurality of local devices;
    storing the user mark for each local device of the plurality of local devices;
    receiving a first location input from a user touching a global touchscreen of a global device of a moving vehicle, wherein the first location input is a location relative to a display surface of the global touchscreen and indicates a stored user mark;
    identifying a local device of the plurality of local devices that is associated with the stored user mark;
    determining movement of the global device of the moving vehicle that is different from movement of the local device, wherein the local device has a motion sensor, and wherein the local device is associated with the user;
    retrieving motion information from the motion sensor of the local device, wherein the motion information comprises acceleration and indicates movement of the user associated with the local device;
    correcting the first location input to a second location input at the global touchscreen of the global device of the moving vehicle based on the motion information from the motion sensor of the local device; and
    based on the second location input, performing an operation at the global device of the moving vehicle.

2. The computer-implemented method of claim 1, wherein the local device is remote from the global device of the moving vehicle.

3. The computer-implemented method of claim 1, further comprising operations for:
    registering the plurality of local devices with the global device of the moving vehicle.

4. The computer-implemented method of claim 1, wherein the user mark comprises a fingerprint.

5. The computer-implemented method of claim 1, further comprising:
    notifying the local device to accept the second location input to perform processing based on the second location input.

6. The computer-implemented method of claim 1, further comprising operations for:
  storing local device and user information.

7. A computer program product, the computer program product comprising a computer readable storage medium having program code embodied therewith, the program code executable by at least one processor of a global device of a moving vehicle to perform operations for:
  discovering a plurality of local devices;
  receiving a user mark from each local device of the plurality of local devices;
  storing the user mark for each local device of the plurality of local devices;
  receiving a first location input from a user touching a global touchscreen of the global device of the moving vehicle, wherein the first location input is a location relative to a display surface of the global touchscreen and indicates a stored user mark;
  identifying a local device of the plurality of local devices that is associated with the stored user mark;
  determining movement of the global device of the moving vehicle that is different from movement of the local device, wherein the local device has a motion sensor, and wherein the local device is associated with the user;
  retrieving motion information from the motion sensor of the local device, wherein the motion information comprises acceleration and indicates movement of the user associated with the local device;
  correcting the first location input to a second location input at the global touchscreen of the global device of the moving vehicle based on the motion information from the motion sensor of the local device; and
  based on the second location input, performing an operation at the global device of the moving vehicle.

8. The computer program product of claim 7, wherein the local device is remote from the global device of the moving vehicle.

9. The computer program product of claim 7, wherein the program code is executable by the at least one processor of the global device of the moving vehicle to perform operations for:
  registering the plurality of local devices with the global device of the moving vehicle.

10. The computer program product of claim 7, wherein the user mark comprises a fingerprint.

11. The computer program product of claim 7, further comprising:
  notifying the local device to accept the second location input to perform processing based on the second location input.

12. The computer program product of claim 7, wherein the program code is executable by the at least one processor of the global device of the moving vehicle to perform operations for:
  storing local device and user information.

13. A computer system of a global device of a moving vehicle, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to:
  discover a plurality of local devices;
  receive a user mark from each local device of the plurality of local devices;
  store the user mark for each local device of the plurality of local devices on the one or more computer-readable, tangible storage devices;
  receive a first location input from a user touching a global touchscreen of the global device of the moving vehicle, wherein the first location input is a location relative to a display surface of the global touchscreen and indicates a stored user mark;
  identify a local device of the plurality of local devices that is associated with the stored user mark;
  determine movement of the global device of the moving vehicle that is different from movement of the local device, wherein the local device has a motion sensor, and wherein the local device is associated with the user;
  retrieve motion information from the motion sensor of the local device, wherein the motion information comprises acceleration and indicates movement of the user associated with the local device;
  correct the first location input to a second location input at the global touchscreen of the global device of the moving vehicle based on the motion information from the motion sensor of the local device; and
  based on the second location input, perform an operation at the global device of the moving vehicle.

14. The computer system of claim 13, wherein the local device is remote from the global device of the moving vehicle.

15. The computer system of claim 13, wherein the program instructions are executable to:
  register the plurality of local devices with the global device of the moving vehicle.

16. The computer system of claim 13, wherein the user mark comprises a fingerprint.

17. The computer system of claim 13, wherein the program instructions are executable to:
  notify the local device to accept the second location input to perform processing based on the second location input.

18. The computer system of claim 13, wherein the program instructions are executable to:
  store local device and user information.

* * * * *